United States Patent

Ahls et al.

[11] Patent Number: 5,293,982
[45] Date of Patent: Mar. 15, 1994

[54] STEP CHAIN PLUG-IN AXLE

[75] Inventors: Hermann W. Ahls, Obernkirchen; Alfons Von Herz, Stadthagen, both of Fed. Rep. of Germany

[73] Assignee: Otis Elevator Company, Farmington, Conn.

[21] Appl. No.: 3,166

[22] Filed: Jan. 12, 1993

[51] Int. Cl.⁵ ............................................ B66B 23/12
[52] U.S. Cl. .................................. 198/332; 198/845
[58] Field of Search ............... 198/327, 321, 330, 332, 198/845

[56] References Cited

U.S. PATENT DOCUMENTS

| | | | |
|---|---|---|---|
| 2,114,180 | 8/1938 | Guba | 198/845 X |
| 2,318,925 | 5/1943 | Cook | 198/845 X |
| 2,570,135 | 10/1951 | Loughridge | 198/332 |
| 2,628,705 | 2/1953 | Kline et al. | 198/845 |
| 3,220,535 | 11/1965 | Franklin et al. | 198/845 X |
| 3,866,743 | 2/1975 | Jorgensen | 198/845 X |
| 4,175,652 | 11/1979 | Satou et al. | 198/332 |
| 4,635,783 | 1/1987 | Höfling | 198/332 X |
| 4,645,059 | 2/1987 | Höfling et al. | 198/321 |

*Primary Examiner*—D. Glenn Dayoan

[57] ABSTRACT

A step chain is provided for a person conveying device having a first strand, a second strand, a plurality of connecting axles and an attachment apparatus for detachably attaching the connecting axles to the first and second strands.

4 Claims, 3 Drawing Sheets

STEP CHAIN PLUG-IN AXLE

BACKGROUND OF THE INVENTION

1. Technical Field

This invention relates to people moving devices in general, and more particularly to people moving devices which employ a step chain.

2. Background Art

Escalators are a known method for conveying people from a first elevation to a second elevation. Typically, an escalator includes a frame, a drive, a step chain and a pair of balustrade assemblies. The frame comprises a truss section on both the left and right hand sides of the frame. By convention, the side of the escalator on the left of a person facing the escalator at the lower elevation is called the left hand side of the escalator, and the side to the person's right is called the right hand side. Each truss section has two end sections parallel to one another, connected by an inclined midsection. The end sections form landings at the two elevations connected by the midsection, one on each end. Matching pairs of roller tracks are attached on the inside of each truss section, i.e. the side of the truss section facing the other truss section.

The escalator drive is attached to the frame in the upper landing, between the trusses. The drive typically drives a step chain sprocket assembly consisting of a pair of step chain sprockets, a pair of handrail sprockets, and an axle extending from one side of the frame to the other. The two step chain sprockets power a step chain formed in a loop running from the first elevation to the second elevation.

The step chain consists of a pair of chain strands, having a plurality of rollers, and a plurality of connecting axles for connecting the two chain strands. Each strand is formed from a plurality of chain links. Each link has a pair of side plates, an axle, and a roller. The axle is received in the center of the roller. A side plate of the link and a side plate of the next link in line, are attached to the axle on both sides of the roller, thereby holding the roller and axle together. This link arrangement is repeated as many times as is necessary to arrive at the length strand, and therefore the length chain, desired.

Every "$n^{th}$" link in the strand is connected to the aligned strand on the other side of the frame. Connecting the axles together ties the two independent strands into a single step chain. One strand of the step chain rides a roller track on the right side of the frame and the other strand rides the matching roller track on the left hand side of the frame. Each pair of connected rollers provides the support for one tread plate.

The rollers may be connected in a number of different ways. First, it is known in the art for the aligned rollers to share a common axle. The common axle extends through the two aligned links, acting as a single axle for the aligned rollers. Another method incorporates strands having aligned stub axles which extend out a specific distance toward the other strand. In a first embodiment, a tread plate receives each stub axle in a bore on that side of the tread plate, thereby connecting the aligned stub axles. In a second embodiment, a connecting axle independent of the tread plate receives the aligned stub axles. The stub axles are press fit into bores on the ends of the connecting axle and the tread plate is attached to the connecting axle. In a third embodiment, the tread plates are directly attached to the stub axles. A connecting axle, independent of the tread plate, receives the aligned stub axles on the inside of the tread plate. Holes are drilled in the connecting axle and the stub axles to receive pins. The pins fix the connecting axles to the stub axles.

All of these methods of connecting the aligned rollers have distinct disadvantages, however. First, step chains having a common axle between aligned rollers have a fixed width and therefore cannot be readily interchanged between different width escalators. Moreover, if a common axle becomes damaged, both strands must be disassembled to repair the chain.

Second, using stub axles connected by tread plates alone creates an undesirable loading on the roller bearing. The yoke of the tread plate attaches to the unsupported stub axle outside of the centerline of the roller bearing thereby creating a cantilever type arrangement. As a result, the roller bearing experiences not only a load, but a moment as well. The combination of load and moment create an undesirable stress on the roller bearings which negatively effects the $B^{10}$ life of the bearings. Increased maintenance frequency on an escalator seriously diminishes the desirability and quality reputation of the escalator.

In the case of the press fit connecting axle, the disadvantage lies in the difficulty of assembling and disassembling the step chain in the factory and especially in the field. To get the proper press fit, the connecting axle and the stub axles must either be forced together or the connecting axles must be heated and sweated onto the stub axles. Either way, the process is time consuming and difficult to disassemble in the field.

Finally, attaching the tread plate to the stub axles and pinning the connecting axle to the stub axle is also disadvantageous. Pinning the connecting axle necessitates holes being drilled either at assembly or during the manufacturing of the separate pieces. In the former case, drilling every connecting axle at assembly is a labor intensive and time consuming function. In the latter case, alignment of the bores must be precise or an interference will occur. The potential for undesirable error, either way, is present during the assembly process.

DISCLOSURE OF THE INVENTION

It is, therefore, an object of the present invention to provide an inexpensive, easy to manufacture and repair step chain that requires minimal maintenance.

According to the present invention, a step chain is provided for a people carrying device having a first strand, a second strand, a plurality of connecting axles and an attachment means for detachably attaching the connecting axles to the first and second strands.

An advantage of the present invention is that it loads the bearings of the chain strands like a beam, instead of a cantilever, and therefore eliminates the moment on the roller bearing, consequently, increasing the life of the bearing.

A further advantage of the present invention is that it permits the step chain to be readily assembled or disassembled. As a result, the step chain is less expensive to ship, easier to handle and readily assembled or repaired.

A still further advantage of the present invention is that the readily replaceable connecting axles may be made in different lengths to accommodate different width tread plates.

These and other objects, features and advantages of the present invention will become more apparent in light of the detailed description of the best mode embodiment thereof, as illustrated in the accompanying drawings.

BEST MODE FOR CARRYING THE INVENTION

Figure 1:
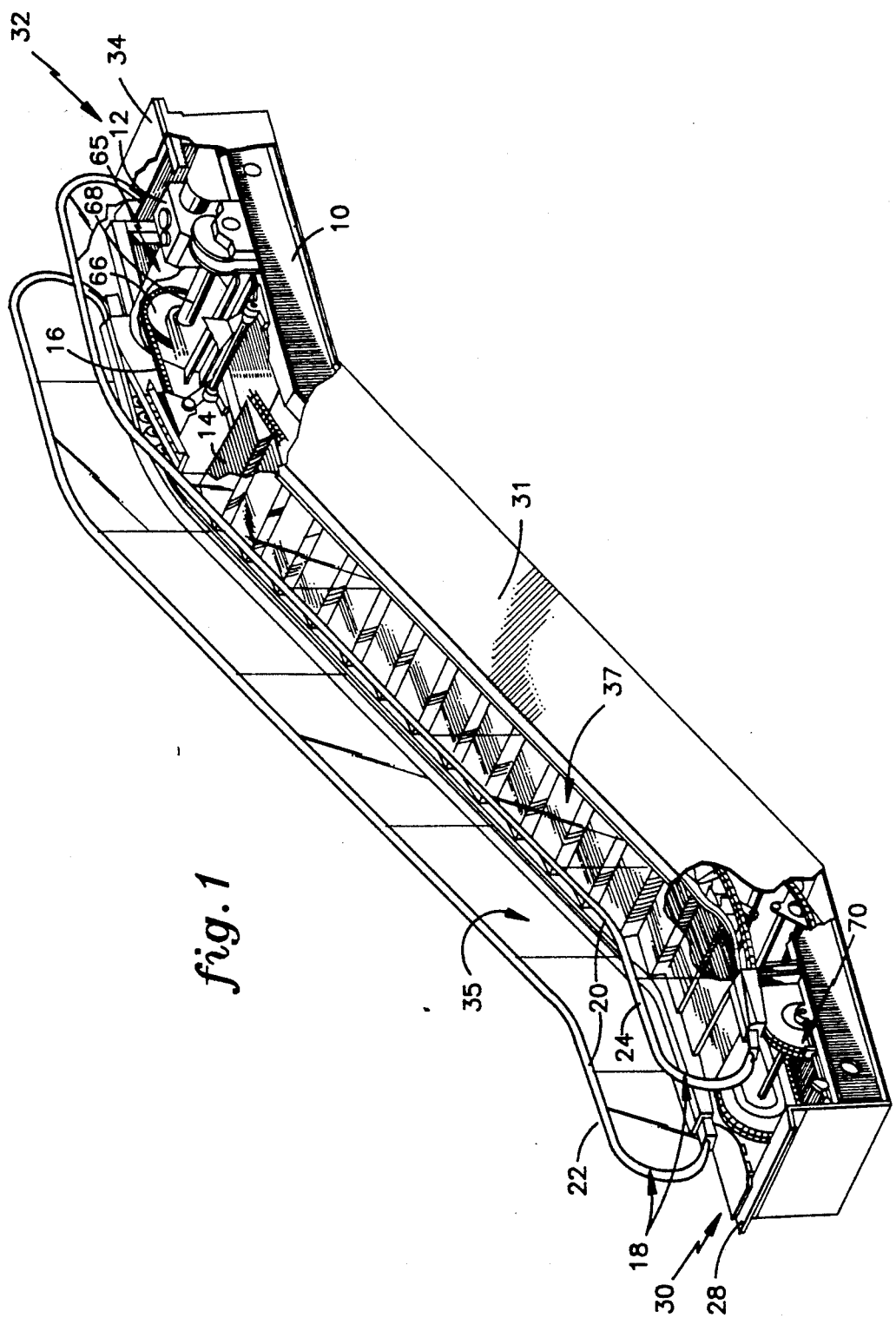
FIG. 1 is an isometric view of an escalator with broken away sections showing details.

Referring to FIG. 1, an escalator is shown having a frame 10, a drive 12, a plurality of tread plates 14 attached to a step chain 16, and a pair of balustrades 18 for guiding a pair of handrails 20. By convention, escalators are said to have a left 22 and a right 24 hand. The left 22 and right 24 hands are determined by standing at a lower first elevation 30 of the escalator and facing the escalator.

The frame 10 typically consists of a weldment of structural steel angularly extending from a first elevation 30 to a second elevation 32. The frame 10 includes pairs of matching roller tracks (not shown) fixed to the frame. One half of each pair is fixed to the left hand side 22 of the frame 10 and the other half to the right side of the frame 24. The frame 10 also forms the structural basis for a landing on each elevation. Hence, the frame 10 begins with a lower landing 28 at a first elevation 30, then angularly extends upward via an inclined midsection 31 to a second elevation 32, where it meets an upper landing 34. The upper landing 34 typically provides the support for the drive 12 used to power the handrails 20 and the step chain 16.

Figure 2:
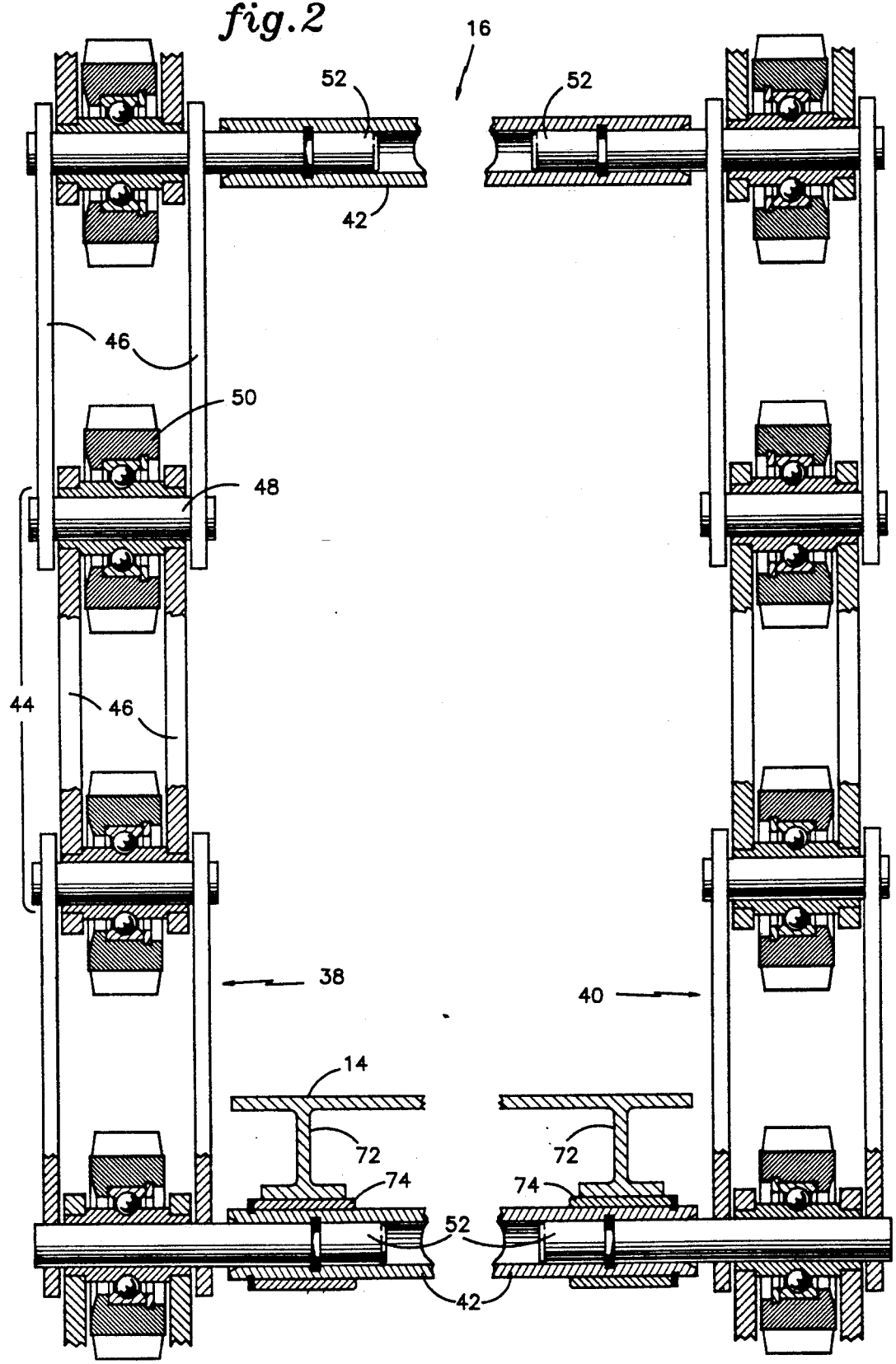
FIG. 2 is a sectional view of a step chain.

Referring to FIG. 2, in the center of the frame 12 (not shown), between the balustrades 18 (not shown), the step chain 16 follows a circuitous path which allows it to draw the attached tread plates 14 either up or down the inclined midsection 31 between elevations. The step chain 16 comprises a left 38 and a right strand 40 and a plurality of connecting axles 42. The left 38 and right 40 strands are left and right hand versions of the same strand. The strands 38,40 comprise a plurality of links 44 pivotally attached to one another. Each link 44 has a pair of side plates 46, an axle 48, and a bearing mounted roller 50. The axle 48 is received in the center of the roller 50. A side plate 46 of the link 44 and a side plate 46 of the link 44 next in line, are attached to the axle 48 on both sides of the roller 50, thereby holding the roller 50 and axle 48 together. The heretofore described link 44 arrangement is repeated as many times as is necessary to arrive at the length chain 16 desired.

Figure 3:
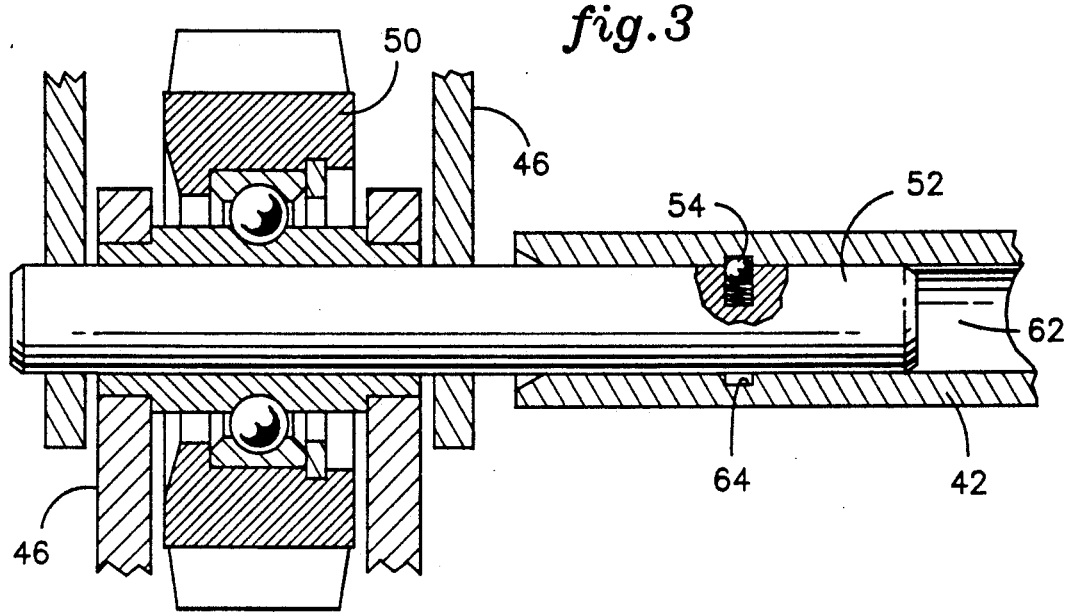
FIG. 3 is a diagrammatic view of part of a step chain link showing an embodiment of the attachment means.
Figure 4:
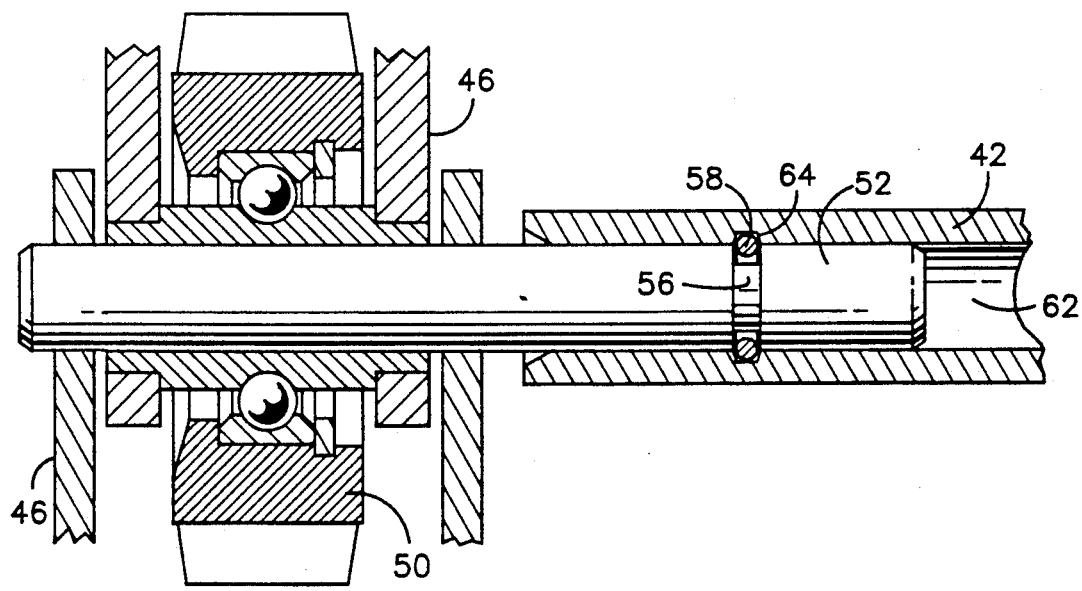
FIG. 4 is a diagrammatic view of part of a step chain link showing an embodiment of the attachment means.

Referring to FIGS. 2-4, every "$n^{th}$" link in the left 38 and right 40 strands further comprises a cylindrical stub axle 52 which extends outside the side plate 46 on one side of the link 44. The stub axles 52 of the left 38 and right 40 strands point toward the center of the escalator, and therefore toward one another. In a first embodiment, the stub axles 52 contain a ball bearing 54 (see FIG. 3) biased to extend partially outside of the radial surface of the axle 52, as is known in the art. In a second embodiment, the stub axles 52 have a radial groove 56 (see FIG. 4) extending around the circumference of the stub axle 52. Snap rings 58 are provided which may be slidably received within the radial grooves 56.

In both embodiments, the aligned stub axles 52 are received within a connecting axle 42. The connecting axles 42 may be a solid rod with a bore 62 on each end or alternatively may be a tube. Either way the connecting axles 42 further comprise a radial groove 64 on the inner diameter of the tube or bore 62. In the first embodiment, inserting the stub axles 52 into the connecting axle forces the ball bearings 54 radially inward toward the center of each stub axle 52. When a ball bearing 54 aligns with one of the radial grooves 64 in the inner diameter of the connecting axle 42, the ball 54 extends radially outward and into the groove 64, thereby preventing relative movement between the stub axle 52 and the connecting axle 42. The stub axle 52 and the connecting axles 42 may be detached from one another by applying an axial force. How much axial force must be applied depends upon the magnitude of the force biasing the ball bearing 54 radially outward.

In the second embodiment, inserting the stub axles 52 into the connecting axle forces the snap rings 58 into the groove 56 in each stub axle 52. When a snap ring 58 aligns with one of the radial grooves 64 in the inner diameter of the connecting axle 42, the snap ring 58 extends radially outward and into the groove 64 in the connecting axle 42, thereby preventing relative movement between the stub axle 52 and the connecting axle 42. The stub axle 52 and the connecting axles 42 may be detached from one another by applying an axial force. How much axial force must be applied depends upon the magnitude of the force biasing the snap ring 58 radially outward.

In both embodiments, the attachment means for attaching the connecting axle 42 and the stub axle 52 is such that the connecting axle 42 and the stub axles 52 can be readily detached. Either strand of the chain, therefore, may be easily replaced as necessary. This is a decided advantage since it is more typical that one strand will wear out before the other.

On the other hand, the attachment means for attaching the connecting axle 42 and the stub axle 52 may also be such that the connecting axle 42 and the stub axles 52 cannot be readily detached. For example, the geometry of the grooves 64 in the inner diameter of the connecting axle 42 or the forces biasing the snap rings 58 or ball bearings 54 may be chosen such that the connecting axles 42 cannot be readily detached. Despite not being readily detachable, this configuration still enjoys ease of assembly and improved loading on the roller bearings.

Referring to FIG. 1, in a building having an escalator extending from a lower first elevation 30 to a second higher elevation 32, the escalator frame 10 is fixed to the first and second elevations by conventional means. The drive 12, located within the upper landing 34 on the second elevation 32, drives a first step chain sprocket assembly 65. The chain sprocket assembly 65 includes a pair of step chain sprockets 66 connected by an axle 68 extending across the width of the escalator frame 10.

Between the two balustrades 18, the step chain sprockets 66 drive the step chain 16 and attached tread plates 14 in a circuitous path from the upper landing 34 to the lower landing 28 and back. Because of the circuitous path, tread plates 14 are always exposed in each landing 28,34 and along the inclined midsection 31. A first roller track (not shown), one half on each side of the frame 10, guides and supports the step chain 16. A second roller track (not shown), one half on each side of the frame 10, supports a pair of rollers (not shown) attached to the base of each tread plate 14.

The tread plates 14 enter the exposed portion of the step chain 16 travel path aligned in a level surface, thereby forming a landing from which a passenger may enter the escalator. Subsequently, as the tread plates 14 enter the inclined midsection 31, each tread plate 14 either raises or drops relative to the adjacent tread plate 14, depending on the rotational direction of the escalator relative to the midsection. As the tread plates 14 enter the opposite landing, the incline or decline fades into a straightaway and the tread plates 14 again align into a single flat surface. Subsequently, the step chain 16 and attached tread plates 14 revolve around a second step chain sprocket assembly 70 and return back, underneath the exposed tread plates 14 toward the first step chain sprocket 66.

Referring to FIGS. 1 and 2, every link 44 in the step chain 16 experiences a load by virtue of the chain sprockets 66 pulling or lowering the chain 16 up or down the midsection 31. The links 44 having connecting axles 42 also experience an individual load if a person or object rests on the tread plate 14 attached to that particular connecting axle 42. The loading on the connecting axle links may be described as a pair of point loads supported by a beam. Specifically, the load is directly applied to the tread plate 14 and is, in turn, transferred to the connecting axle 42 via the yokes 72 of the tread plate 14. Each yoke 72 is fixed to the connecting axle 42 by a bushing 74 slidably mounted on the connecting axle 42 and a pin (not shown) attached to the yoke 72. The yokes 72 receive the bushings 74 and the pins fix the yokes 72 to the bushings 74. The bushings 74, therefore, not only pivotly mount the tread plates 14 to the connecting axles 42, but also help distribute the load. The connecting axle 42 can therefore be described as a beam supported on each end. The beam mounts, which are in this case the rollers 50 attached to the stub axles 52, in turn transfer the load to the roller tracks (not shown) attached to the frame 10 of the escalator. No moments are created because the stub axles 52 are not cantilevered. Roller bearings experiencing a radial load have a longer B-10 life than do roller bearings experiencing both a radial load and a moment.

Although this invention has been shown and described with respect to the detailed embodiments thereof, it will be understood by those skilled in the art that various changes in form and detail thereof may be made without departing from the spirit and scope of the claimed invention.

We claim:

1. A step chain for a person conveying device having a plurality of tread plates drawn along a predetermined path by said step chain, comprising:
   a first strand, having a plurality stub axles;
   a second strand, having a plurality of stub axles;
   a plurality of connecting axles, for supporting the tread plates which attach to the said connecting axles, wherein said stub axles of said first and second strands are received within and spaced apart by said connecting axles; and
   a plurality of snap rings, for attaching said connecting axles to said stub axles of said first and second strands, wherein each snap ring is received within a first groove in either of said stub axle or said connecting axle, such that when said stub axle is received within said connecting axle, said snap ring is biased into said first groove until said first groove and a second groove in the other of said stub axle or said connecting axle are aligned, then said snap ring radially expands partially out of said first groove and into said second groove, thereby preventing axial movement of said stub axle relative to said connecting axle.

2. A step chain for a person conveying device having a plurality of tread plates drawn along a predetermined path by said step chain, comprising:
   a first strand, having a plurality stub axles;
   a second strand, having a plurality of stub axles;
   a plurality of connecting axles, for supporting the tread plates which attach to the said connecting axles, wherein said stub axles of said first and second strands are received within and spaced apart by said connecting axles; and
   a plurality of ball bearings, received within one of said stub axle or said connecting axle and biased to extend partially outside of a radial surface of said axle, and a radial groove in the other of said stub axle or said connecting axle, wherein when said stub axle is received within said inner diameter of said connecting axle, and said ball bearing aligns with said radial groove, said ball bearing extends into said groove, thereby preventing axial movement of said stub axle relative to said connecting axle.

3. A step chain for a person conveying device having a plurality of tread plates drawn along a predetermined path by said step chain, comprising:
   a first strand, having a plurality of stub axles;
   a second strand, having a plurality of stub axles;
   a plurality of connecting axles, for supporting the tread plate which attach to the said connecting axles, wherein said stub axles of said first and second strands are received within and spaced apart by said connecting axles; and
   a ball bearing, for detachably attaching said connecting axles to said stub axles of said first and second strands, said ball bearing received within one of said stub axle or said connecting axle and biased to extend partially outside of a radial surface of said axle, and a radial groove in the other of said stub axle or said connecting axle, wherein when said stub axle is received within said inner diameter of said connecting axle, and said ball bearing aligns with said radial groove, said ball bearing extends into said groove, thereby preventing axial movement of said stub axle relative to said connecting axle.

4. A step chain for a person conveying device having a plurality of tread plates drawn along a predetermined path by said step chain, comprising:
   a first strand, having a plurality stub axles;
   a second strand, having a plurality of stub axles;
   a plurality of connecting axles, for supporting the tread plates which attach to the said connecting axles, wherein said stub axles of said first and second strands are received within and spaced apart by said connecting axles; and
   a snap ring, for detachably attaching said connecting axles to said stub axles of said first and second strands, said snap ring received within a first groove in one of said stub axle or said connecting axle, and a second groove in the other of said stub axle or connecting axle, wherein when said stub axle is received within said connecting axle, said snap ring is forced radially biased into said first groove until said first groove and said second groove are aligned, then said snap ring radially expands partially out of said first groove and into said second groove, thereby preventing axial movement of said stub axle relative to said connecting axle.

* * * * *